United States Patent
Tomiyama et al.

(10) Patent No.: US 7,172,154 B2
(45) Date of Patent: Feb. 6, 2007

(54) CATCH DEVICE OF COCKPIT DOOR

(75) Inventors: Seiichi Tomiyama, Tokyo (JP);
Takaharu Ozono, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 11/079,102

(22) Filed: Mar. 15, 2005

(65) Prior Publication Data
US 2005/0224649 A1  Oct. 13, 2005

(30) Foreign Application Priority Data
Mar. 18, 2004 (JP) ............................ 2004-077848

(51) Int. Cl.
B64B 1/14 (2006.01)
(52) U.S. Cl. .............................. 244/118.5; 244/129.5; 292/254
(58) Field of Classification Search ...................... None
See application file for complete search history.

(56) References Cited

U.S. PATENT DOCUMENTS

| | | | | |
|---|---|---|---|---|
| 2,287,710 A * | 6/1942 | Sayles | ......................... | 292/236 |
| 3,543,547 A * | 12/1970 | Sugiyama | .................... | 70/277 |
| 3,638,984 A * | 2/1972 | Davidson | ............... | 292/341.16 |
| 3,872,696 A * | 3/1975 | Geringer | ....................... | 70/145 |
| 4,355,830 A * | 10/1982 | Rau, III | ....................... | 292/144 |
| 5,076,625 A * | 12/1991 | Oxley | .................... | 292/341.16 |
| 5,474,342 A * | 12/1995 | Smith et al. | ................. | 292/254 |
| 2002/0092951 A1 * | 7/2002 | Haviv | ..................... | 244/118.5 |
| 2005/0006528 A1 * | 1/2005 | Movsesian et al. | ....... | 244/129.5 |

FOREIGN PATENT DOCUMENTS

| | | |
|---|---|---|
| JP | 2000-35656 | 2/2000 |
| JP | 2003-74232 | 3/2003 |
| JP | 2003-113684 | 4/2003 |

\* cited by examiner

*Primary Examiner*—Galen Barefoot
(74) *Attorney, Agent, or Firm*—Westerman, Hattori, Daniels & Adrian, LLP.

(57) ABSTRACT

The invention provides a catch device of a cockpit door of an aircraft with improved safety. A cockpit door 1 disposed between a cockpit 2 and a passenger cabin 3 in an aircraft comprises a door body 10 that opens toward the cockpit via a hinge 12. A latch device 100 for opening and closing the door is provided on the cockpit side, and a bolt 120 thereof engages with a catch device 200 provided on a wall adjacent to the door. The catch device 200 has a solenoid device which restrains the rotatably disposed catch device by electromagnetic force. When trouble occurs to the solenoid, the restrained status of the catch member is released and the cockpit door may be opened. In such case, a pit pin 300 is inserted to the catch device to restrict rotation of the catch member.

4 Claims, 5 Drawing Sheets

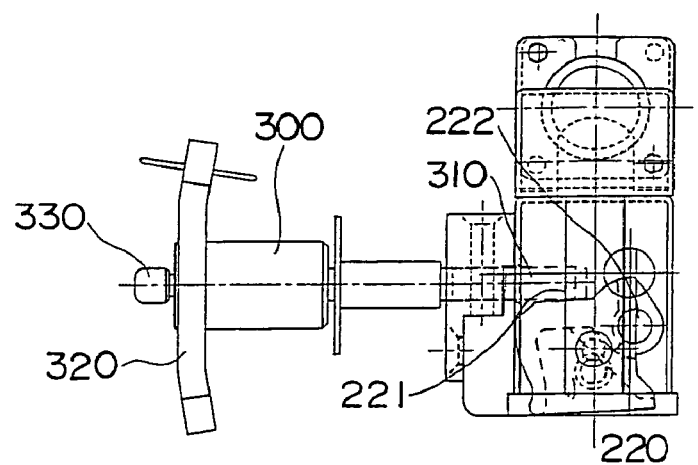
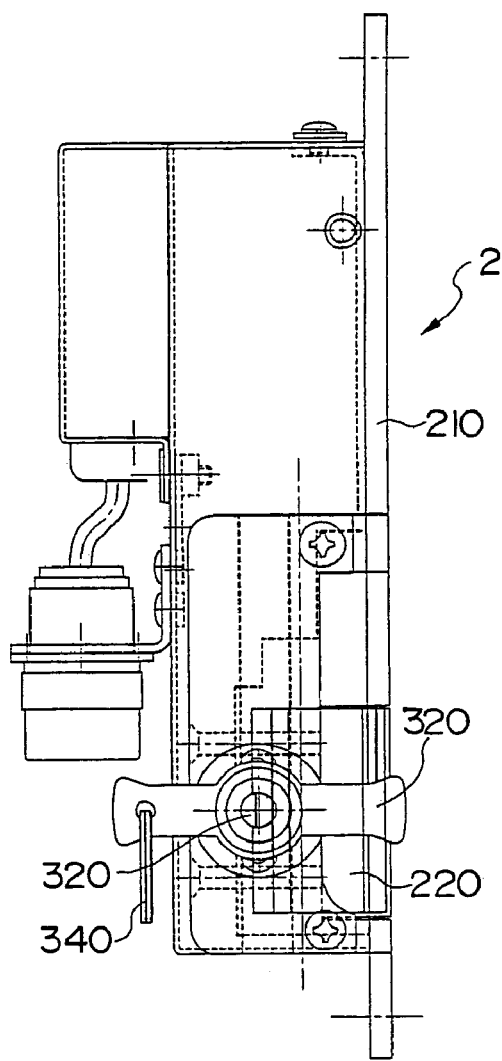
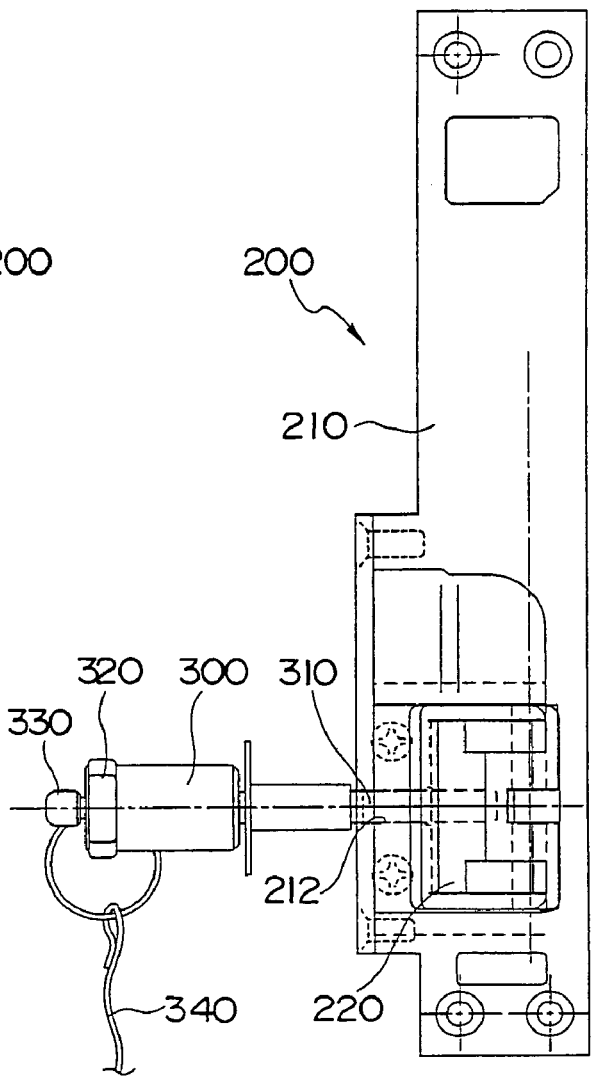
FIG. 3 (c)
FIG. 3 (b)
FIG. 3 (a)

CATCH DEVICE OF COCKPIT DOOR

The present application is based on and claims priority of Japanese patent application No. 2004-077848 filed on Mar. 18, 2004, the entire contents of which are hereby incorporated by reference.

BACKGROUND OF THE INVENTION

1. Field of the Invention

The present invention relates to a catch device of a cockpit door disposed between a cockpit and a passenger cabin on an aircraft.

2. Description of the Related Art

Devices for locking a door using solenoid are disclosed in the following patent documents: Japanese Patent Application Laid-Open Publication No. 2003-113684 (patent document 1); Japanese Patent Application Laid-Open Publication No. 2003-74232 (patent document 2); and Japanese Patent Application Laid-Open Publication No. 2000-35656 (patent document 3).

The cockpit door is a single swinging hinged door equipped with a mechanism for locking and unlocking the door using a latch and a catch disposed on the side of the door opposite from the hinge.

The cockpit door has a latch provided on the cockpit side for safety. According to a known system, the catch is designed to be retained by a solenoid, and an electric switch provided on the passenger cabin side is used for releasing the catch.

In such system, the electric switch provided on the passenger cabin side can be, for example, a numeric keypad switch, which is operated by inputting a security code number.

The system is designed so that the solenoid retains the catch when power is supplied thereto. One reason for this is because the system is designed so as not to obstruct maintenance crews from entering the cockpit, for example, when the aircraft is subjected to maintenance on the ground.

However, if power to the solenoid is shut down by some reason during flight of the aircraft, the catch of the door will be released and the cockpit door may unexpectedly be opened.

SUMMARY OF THE INVENTION

The object of the present invention is therefore to solve the problems mentioned above and to provide a solenoid catch device for a cockpit door.

According to the catch device of a cockpit door according to the present invention, the catch device comprises a door body capable of being opened toward the cockpit via a hinge disposed on one side portion of the door body; a latch device equipped on the other side portion of the door body on the cockpit side of the door body; a catch device disposed on a wall of the aircraft for receiving a bolt of the latch device, the catch device comprising a housing, a catch member for a bolt that is rotatably disposed within the housing, and a solenoid device for restricting the rotation of the catch member; and a pit pin for restricting the rotation of the catch member by being inserted to a hole formed to the housing in case a problem occurs to the solenoid device.

Further, the catch device of a cockpit door according to the present invention comprises a door body capable of being opened toward the passenger cabin via a hinge disposed on one side portion of the door body; a latch device equipped on the other side portion of the door body on the cockpit side of the door body; a catch device disposed on a wall of the aircraft for receiving a bolt of the latch device, the catch device comprising a housing, a catch member for a bolt that is rotatably disposed within the housing, and a solenoid device for restricting the rotation of the catch member; and a pit pin for restricting the rotation of the catch member by being inserted to a hole formed to the housing in case a problem occurs to the solenoid device.

Further, the solenoid device is equipped with a function to restrict the rotation of the catch member when power is supplied thereto.

According to the present invention, even if the operation of the solenoid device is disturbed, the rotation of the catch member is restricted and the opening of the cockpit door can be prevented.

BRIEF DESCRIPTION OF THE DRAWINGS

FIG. 3 is an explanatory view of a catch device and a pit pin;

DETAILED DESCRIPTION OF THE PREFERRED EMBODIMENTS

Figure 1:
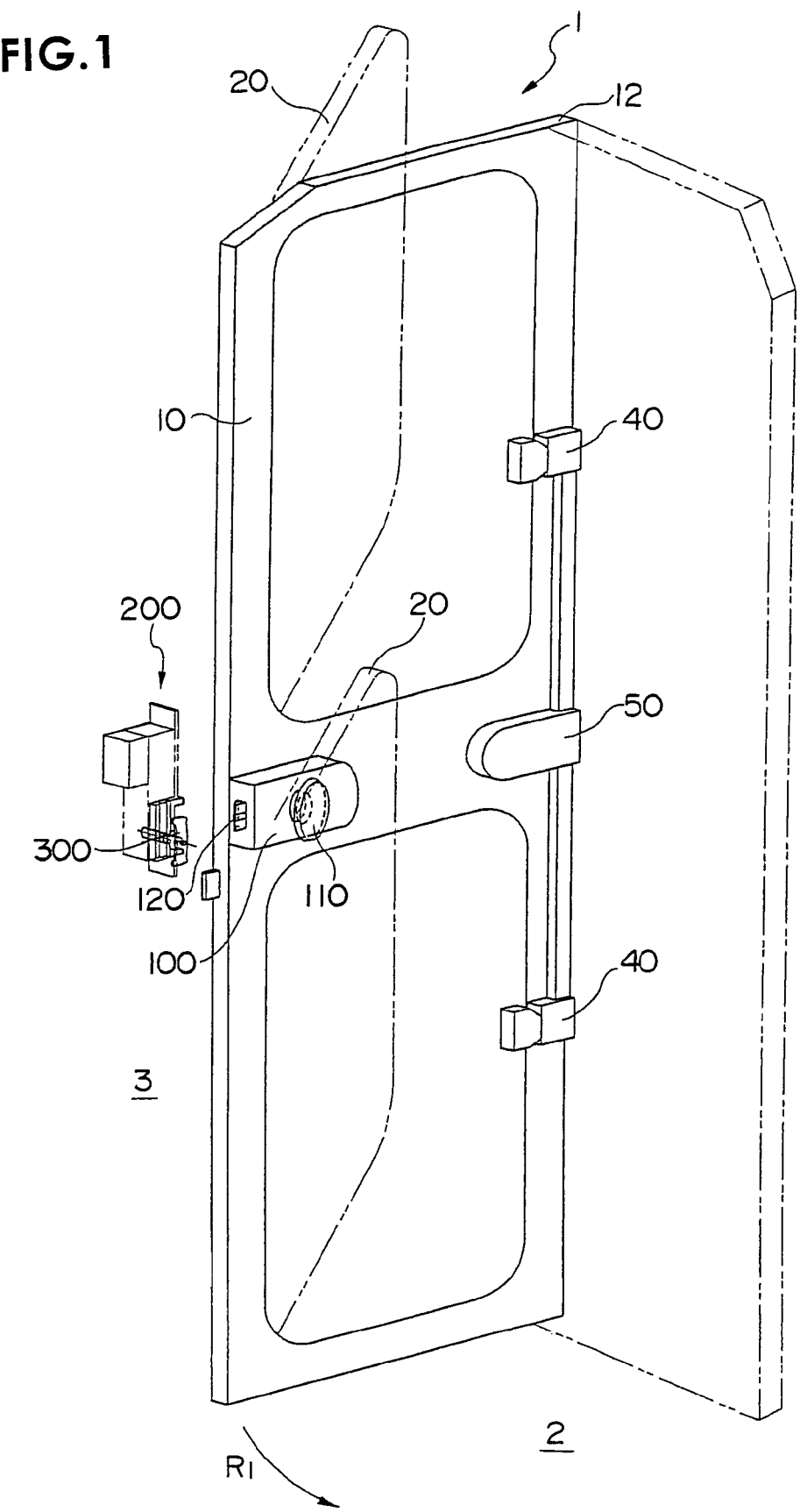
FIG. 1 is an explanatory view of a cockpit door according to an embodiment of the present invention.

FIG. 1 is an explanatory view of a cockpit door according to a preferred embodiment of the present invention.

The cockpit door, the whole of which being denoted by reference number 1, has a door body 10 mounted to an opening formed between a cockpit 2 and a passenger cabin 3, and supported on a wall via a hinge 12.

Two flaps 20, 20 are attached to the door body 10. The flaps 20 are fixed to the door body 10 via a lock device 40 during normal conditions.

The number of flaps can be varied appropriately according to the specifics of the cockpit door. Further, there are cockpit doors that are not equipped with flaps.

When a so-called decompressed condition occurs in which the air pressure within the passenger cabin drops rapidly, a detecting device 50 detects this pressure difference and releases the lock 40. The flaps 20, 20 are opened toward the passenger cabin 3 to relieve the pressure difference.

The cockpit door body 10 is equipped with a latch device 100 disposed on the cockpit side. The latch device 100 includes a bolt 120 that can be manipulated through a knob 110, and the bolt 120 is designed to engage with a catch device 200 disposed on the wall adjacent to the door.

Figure 2:
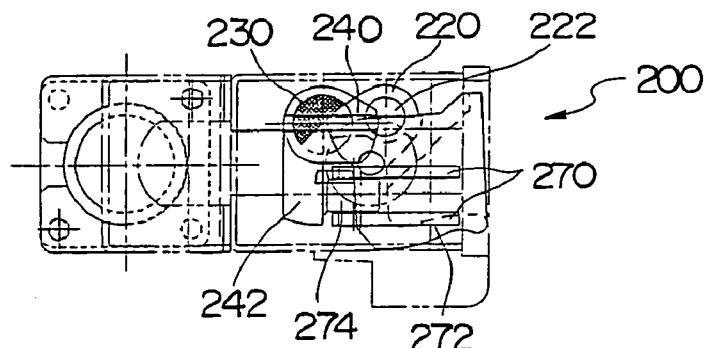
FIG. 2 is an explanatory view of a catch device.
Figure 2:
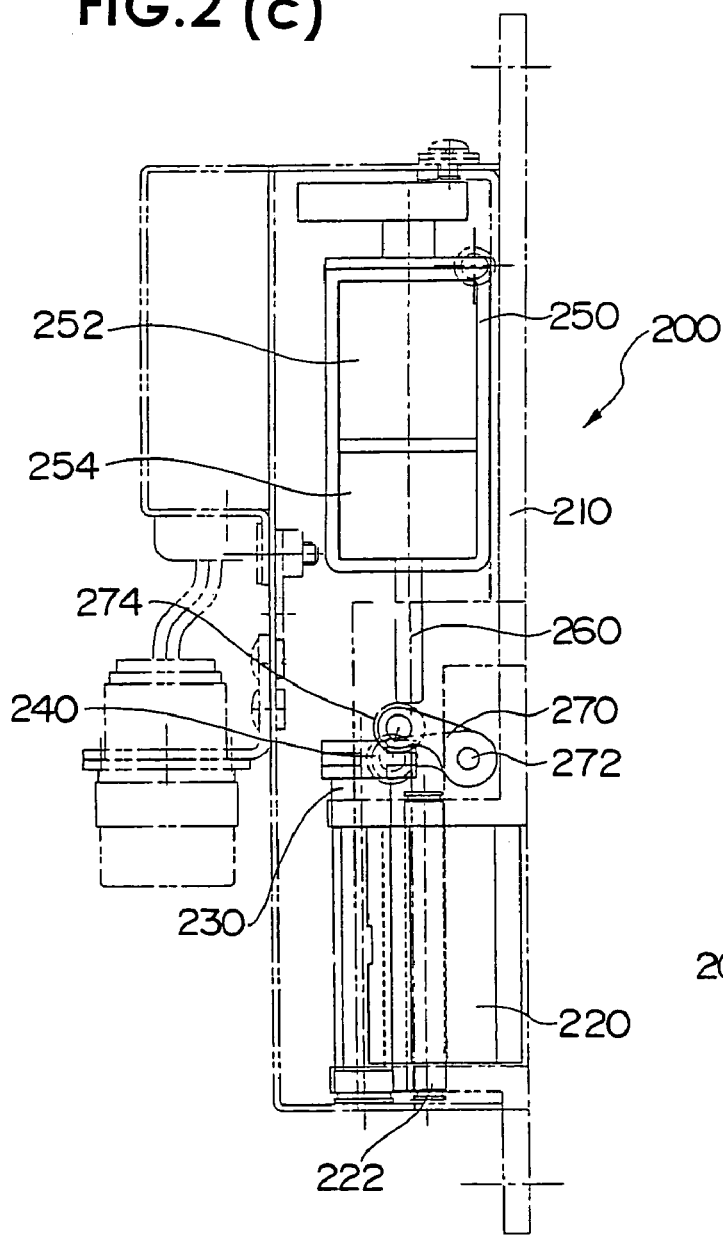
Figure 2:
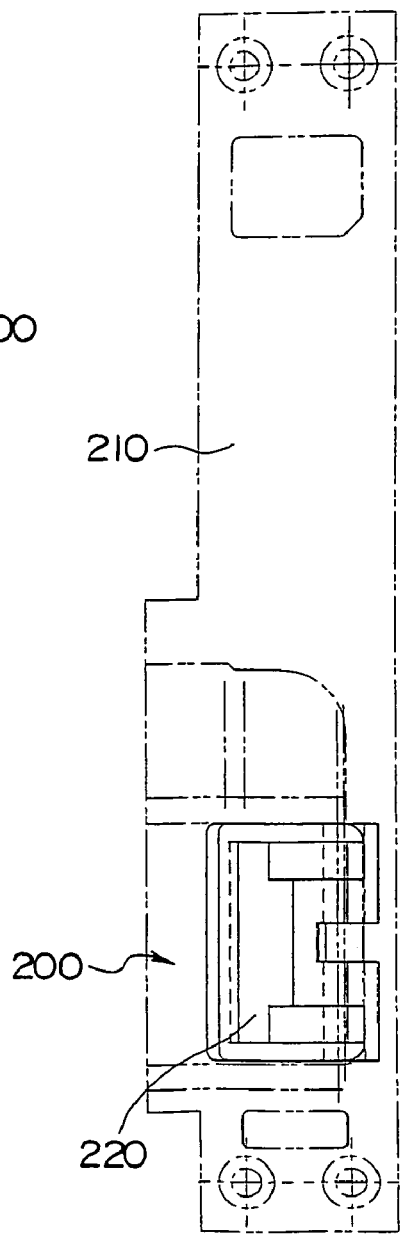

FIG. 2 is an explanatory view showing the structure of the catch device.

The catch device 200 has a housing 210 and is secured on the wall. The housing 210 includes a pouch-shaped catch member 220 attached so as to rotate around a pin 222.

A solenoid device 250 is disposed above the catch member 220. The solenoid device is equipped with two coils 252 and 254 that are disposed serially, and when power is supplied to the coils 252 and 254, a solenoid shaft 260 is pushed down toward the catch member 220. Two link members 270 disposed to swing freely via a supporting pin 272 are positioned below the solenoid shaft 260, and a roller 274 is attached to the end of the two link members 270.

The solenoid shaft 260 rotates the roller 274 and the link members 270 downward.

A cam member 240 is attached to the upper portion of a shaft member 230 that is disposed in parallel with a support pin 222 of the catch member 220, and an arm 242 is disposed integrally with the shaft member 230.

When the link members 270 rotate to the downward direction, the end of the link members 270 are positioned so as to interfere with the cam member 240, by which the rotation of the shaft 230 is blocked. Thus, the arm 242 that is integrally formed with the shaft 230 comes into contact with the back surface of the catch member 220, by which the rotary movement of the catch member 220 is restricted.

Since the catch device 200 is structured as described above, it is possible to prevent the catch member from being released when power is supplied to the solenoid device 250.

However, when power supply to the solenoid device 250 is shut down due to some reason, the engagement of the catch device 200 is released and the cockpit door 10 will be opened even with the bolt 120 of the latch device 100 protruded.

For security reasons, it is necessary to keep the cockpit door closed at all times during flight, so there is a need to prevent such matter from occurring.

FIG. 3 is an explanatory view of a pit pin prepared to solve the problem mentioned above.

A pit pin 300 has a narrow inserting pin portion 310 provided on one end thereof, and a handle 320. At the center of the handle 320 is provided a push button 330.

With the push button 330 pushed, the inserting pin portion 310 is inserted to a hole on the other side, and thereafter, the push button 330 is released, by which the inserting pin portion 310 is prevented from being pulled out.

The pit pin 300 is placed in an appropriate location within the cockpit by a washer 340.

By inserting the pit pin 300 into a hole 212 on the catch device 210, the inserting pin portion 310 comes into contact with a back surface 221 of the catch member 220, by which the catch member 220 is restrained.

Figure 4:
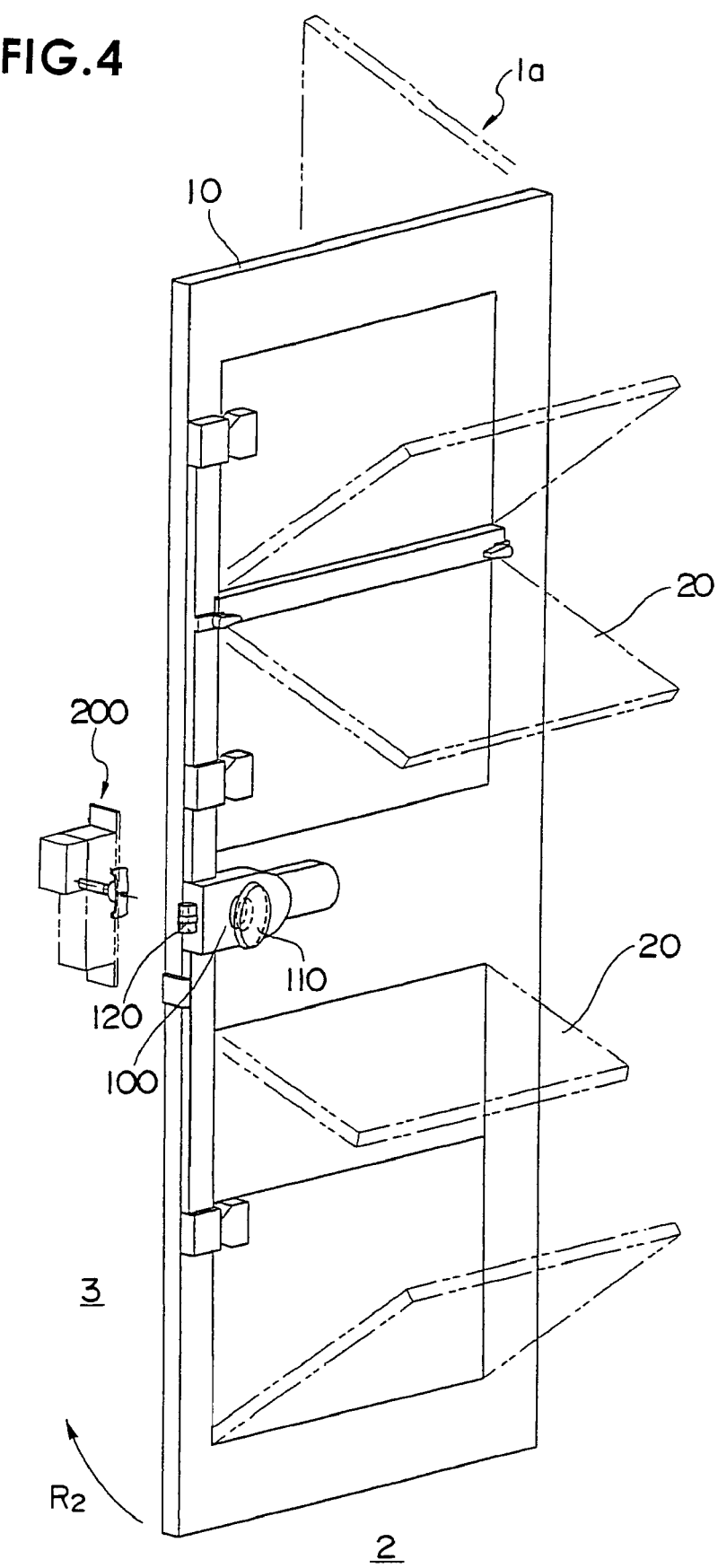
FIG. 4 is an explanatory view of a cockpit door according to another embodiment of the present invention.
Figure 5:
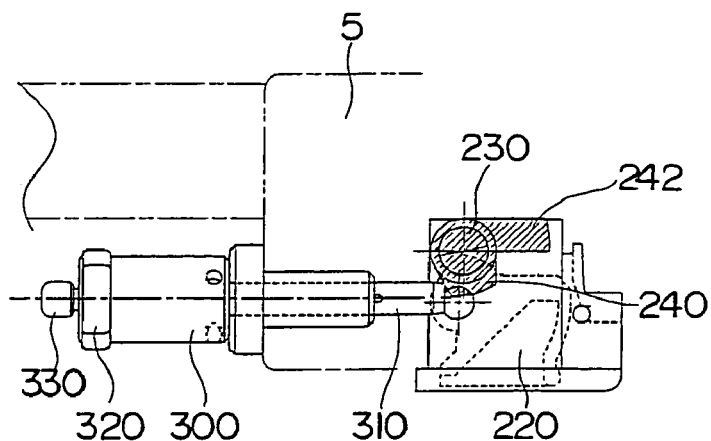
FIG. 5 is an explanatory view of a catch device and a pit pin.
Figure 5:
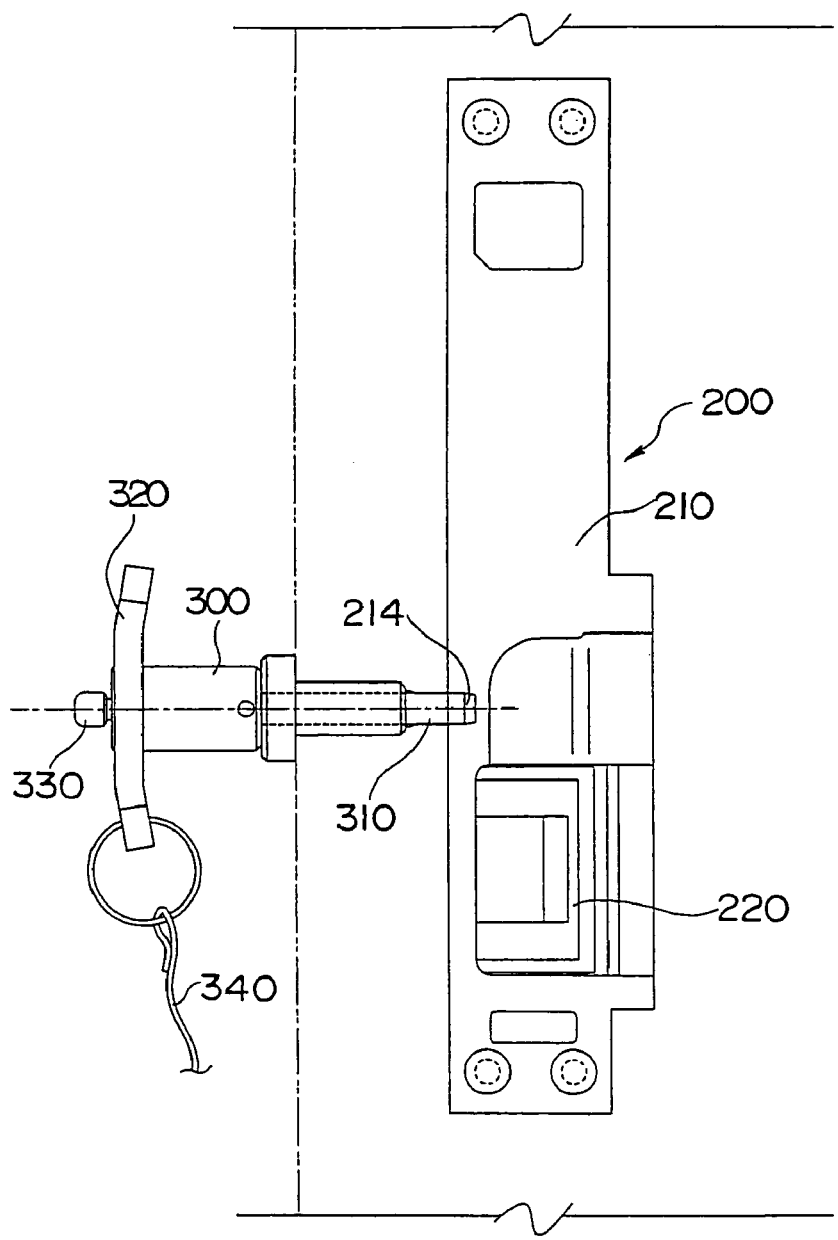

FIGS. 4 and 5 are explanatory views showing another embodiment of the present invention.

Similar to the cockpit door 1 of the previous embodiment, a cockpit door 1a has a body 10 equipped with flaps 20 that are provided in case of decompression.

The cockpit door 1a has a latch device 100 equipped on the side of the cockpit 2, but the door opens toward the passenger cabin, as shown by arrow $R_2$.

The catch device 200 has a housing 210 including a catch member 220, and is restrained by a solenoid device not shown.

Since the cockpit door 1a opens toward the passenger cabin 3, when power supply to the solenoid device is shut down, the catch member 220 is designed to open toward the passenger cabin.

According to the cockpit door structured as described above, a pit pin 300 is inserted from the cockpit side to a frame member 5 on which the catch device 200 is attached, so as to restrict the rotation of a cam member 240 that is rotated by the solenoid device.

When the movement of the cam member 240 is restricted, the arm 242 that is formed integrally with the shaft 230 is also restricted, according to which the restrained status of the catch member 220 is retained.

Since the catch device of the cockpit door according to the present invention is structured as described above, the cockpit door is prevented from being opened when trouble such as the malfunction of the electric circuit occurs.

What is claimed is:

1. A catch device of a cockpit door disposed between a cockpit and a passenger cabin on an aircraft, the catch device comprising:
   a door body capable of being opened toward the cockpit via a hinge disposed on one side portion of the door body;
   a latch device equipped on the other side portion of the door body on the cockpit side of the door body;
   a catch device disposed on a wall of the aircraft for receiving a bolt of the latch device, the catch device comprising a housing, a catch member for a bolt that is rotatably disposed within the housing, and a solenoid device for restricting the rotation of the catch member; and
   a pit pin for restricting the rotation of the catch member by being inserted to a hole formed to the housing in case a problem occurs to the solenoid device, wherein said hole which the pit pin is inserted into is located on the cockpit side of the catch device.

2. A catch device of a cockpit door disposed between a cockpit and a passenger cabin on an aircraft, the catch device comprising:
   a door body capable of being opened toward the passenger cabin via a hinge disposed on one side portion of the door body;
   a latch device equipped on the other side portion of the door body on the cockpit side of the door body;
   a catch device disposed on a wall of the aircraft for receiving a bolt of the latch device, the catch device comprising a housing, a catch member for a bolt that is rotatably disposed within the housing, and a solenoid device for restricting the rotation of the catch member; and
   a pit pin for restricting the rotation of the catch member by being inserted to a hole formed to the housing in case a problem occurs to the solenoid, wherein said hole which the pit pin is inserted into is located on the cockpit side of the catch device.

3. The catch device of a cockpit door according to claim 1, wherein the solenoid device restricts the rotation of the catch member when power is supplied thereto.

4. The catch device of a cockpit door according to claim 2, wherein the solenoid device restricts the rotation of the catch member when power is supplied thereto.

* * * * *